United States Patent
Gutierrez-Castaneda

(10) Patent No.: US 8,078,341 B2
(45) Date of Patent: Dec. 13, 2011

(54) METHOD OF APPLYING AN HTMB GUIDANCE DIRECTIVE

(75) Inventor: Manuel Gutierrez-Castaneda, Toulouse (FR)

(73) Assignee: Thales (FR)

( * ) Notice: Subject to any disclaimer, the term of this patent is extended or adjusted under 35 U.S.C. 154(b) by 431 days.

(21) Appl. No.: 12/348,444

(22) Filed: Jan. 5, 2009

(65) Prior Publication Data
US 2009/0177342 A1 Jul. 9, 2009

(30) Foreign Application Priority Data
Jan. 8, 2008 (FR) ...................................... 08 00102

(51) Int. Cl.
*G01C 23/00* (2006.01)
(52) U.S. Cl. ........................................................... 701/3
(58) Field of Classification Search ................ 701/3, 13, 701/15, 120, 226
See application file for complete search history.

(56) References Cited

U.S. PATENT DOCUMENTS
| | | | |
|---|---|---|---|
| 7,499,771 B2 * | 3/2009 | Caillaud | 701/3 |
| 2007/0061055 A1 | 3/2007 | Stone et al. | |
| 2008/0154486 A1 * | 6/2008 | Coulmeau | 701/120 |

OTHER PUBLICATIONS

Prevot et al., "Air traffic concept utilitzing 4D trajectories and airborne separation assistance" AIAA Guidance Navigation and Control Conference. Aug. 2003, pp. 1-11.
Grimaud et a;l. "Limited Delegation of Separation assurance to the flight crew" Air & space Europe, vol. 3. No. 3/4, 2001, pp. 285-287.
lvanescu D, et al. "A Pilot Decision Support Tool for Merging behind a Lead Aircraft" Decision and Control, 2005 and 2005 European Control conference. CDC-E cc' 05. 44th IEEE Conference on Seville, Spain Dec. 12-15, 2005, Piscataway, NJ, USA, IEEE, Dec. 12, 2005, pp. 3964-3969.

* cited by examiner

*Primary Examiner* — Kim T Nguyen
(74) *Attorney, Agent, or Firm* — Stroock & Stroock & Lavan LLP

(57) ABSTRACT

A method of applying a "Heading Then Merge Behind" (HTMB) guidance directive sent by an air traffic control center to an aircraft comprising a flight management system, the flight management system making it possible to automatically follow the trajectory of an active flight plan. The method includes reception and validation of the directive by the flight management system, confirmation by the pilot of the aircraft of the application of the directive, creation by the flight management system of a flight plan incorporating the directive, activation by the pilot of the flight plan incorporating the directive, so that the directive is executed automatically by the flight management system while following the trajectory of the flight plan incorporating the directive.

23 Claims, 2 Drawing Sheets

METHOD OF APPLYING AN HTMB GUIDANCE DIRECTIVE

CROSS-REFERENCE TO RELATED APPLICATIONS

This application claims the benefit of French Application No. 08 00102, filed Jan. 8, 2008, the entire disclosure of which is incorporated by reference in its entirety.

BACKGROUND

1. Field of the Invention

The present invention relates to a method of applying a "Heading Then Merge Behind" guidance directive. It applies for example in the field of flight management systems.

2. Description of Related Art

A flight plan is the detailed description of the route that must be followed by an airplane within the framework of a planned flight. The flight plan comprises notably a chronological sequence of waypoints described by their position, their altitude and their overflight time. The waypoints constitute a reference trajectory to be followed by the pilot of the airplane if he wishes to best comply with his flight plan. But this reference trajectory is also a valuable aid to the ground control personnel. It allows notably the controller to anticipate the movements of the airplane and thus ensure the ASAS ("Airborne Separation Assurance Systems") functions, for maintaining the inter-aircraft separation criteria. The flight plan is commonly managed aboard civil airplanes by a system referred to as the "Flight Management System", which will be called the FMS subsequently. An FMS makes the reference trajectory available to the onboard personnel and to the other embedded systems.

Essentially with a view to safety, it is therefore necessary to ensure that the airplane follows at least in geographical terms and optionally in scheduling terms the reference trajectory described in the flight plan. For this purpose, guidance procedures make it possible to slave the airplane to the reference trajectory. For example, in so-called "managed" mode, the automatic pilot formulates maneuvers on the basis of the reference trajectory made available by the FMS and executes them automatically so as to follow as closely as possible in three-dimensional space the trajectory corresponding to the reference trajectory. However, in certain situations, it is preferable or indeed indispensable to veer from the reference trajectory. For example, the reference trajectory may cause the airplane to cut across another aircraft, violating the lateral separation criteria. From his ground control center, the traffic controller in charge of the flight perceives the risk in advance since he is cognizant of the whole of the aerial situation within a wide perimeter around the aircraft that he is controlling. He then implements pre-established ASAS procedures for coordination between the ground and the craft, these procedures commonly being grouped together under the name "Radar Vectoring". "Radar Vectoring" procedures can make it possible to ensure that two aircraft cross under optimum safety conditions. They are based on a set of guidance instructions or "directives", also predefined, that the controller passes to the pilot. Hereinafter in the present application, these guidance directives will be termed "ATC directives", the acronym standing for "Air Traffic Control". These directives are moreover commonly grouped together under the name "clearance ATC". The pilot then disengages the functions of automatic following of the reference trajectory and manually executes the ATC directives that he receives from the controller, one after another, each time confirming their execution to the controller. Very often, the directives are exclusively passed verbally by VHF radio, the pilot confirming execution by phone also, although certain recent systems use data links in parallel to exchange ATC directives in the form of digitized messages.

For example, in order to maintain the criteria of lateral separation with another aircraft, the controller can pass the pilot an ASAS directive known as "Heading Then Merge Behind", which will simply be called an "HTMB directive" hereinafter. In an approach zone or in a terminal zone, an HTMB directive serves notably to delay the alignment of an airplane with a landing runway, so as to control the temporal offset between two airplanes which share one and the same approach trajectory and which align themselves with one and the same runway. Since for these two airplanes, there is necessarily a convergence point with loss of spatial separation and risk of loss of temporal separation. An HTMB directive sent to the airplane that is supposed to land second makes it possible to guarantee a temporal separation between the two airplanes. This HTMB directive firstly indicates to the pilot which is "the target airplane" behind which he aligns himself, this target airplane necessarily being situated in proximity. It also indicates to the pilot a diversion heading to be followed temporarily, this diversion heading not corresponding to the envisaged heading on his reference trajectory. It also indicates to the pilot a rallying position for his reference trajectory, referred to as a "merge" point. Finally, it indicates to the pilot a separation in distance or in time to be complied with at the rallying position with respect to the target airplane behind which he aligns himself. With current FMSs, the pilot receiving an HTMB directive disengages the automatic pilot. Specifically, current FMSs do not ensure any ASAS functions such as the application of an HTMB directive. The pilot therefore manually follows the diversion heading indicated in the HTMB directive. It should be understood that this does not call into question the ASAS concept and the associated operational procedures, several levels of sharing of responsibilities between the ground controller and the pilot having been envisaged for implementing the ASAS procedures. But in certain cases, in addition to manually following the diversion heading, the pilot may also have to estimate, without assistance, the instant or position at which he ceases manually following this diversion heading so as to set a course heading towards the rallying position, it being absolutely essential that this instant or this position should make it possible to comply with the separation in distance or in time with respect to the target airplane. Manifestly, the work overload for the pilot and the stress generated are detrimental to flight safety. This is one of the technical problems that the present invention proposes to solve.

BRIEF SUMMARY

The aim of the invention is notably to alleviate the aforesaid drawbacks. For this purpose, the subject of the invention is a method of applying an ATC directive sent by an air traffic control center to an aircraft comprising a flight management system, the flight management system making it possible to automatically follow the trajectory of an active flight plan. The directive comprises a target aircraft identifier, a diversion heading, a rallying position and a temporal separation value. The aircraft takes the diversion heading, attain the rallying position behind the target aircraft while complying with the temporal separation value in respect of the target aircraft. The method comprises a step of reception and validation of the directive by the flight management system, the directive being accepted or rejected. The method also comprises a step of confirmation by the pilot of the aircraft of the application of the directive, whether it has been accepted or rejected by the flight management system. The method also comprises a step of creation by the flight management system of a flight plan incorporating the directive. The method also comprises a step of activation by the pilot of the flight plan incorporating the directive, so that the directive is executed automatically by the flight management system while following the trajectory of the flight plan incorporating the directive.

The control center can send the directive to the aircraft by radio, the pilot being able to introduce the directive manually into the flight management system. The control center can also send the directive to the aircraft by data link in the form of a digitized message received by the flight management system.

For example, the flight management system receiving by data link the identifiers of the other aircraft in proximity, through an ADS-B link or a TIS-B link for example, the directive can be rejected by the system if the identifier of the target aircraft has not been received.

For example, the directive can be rejected by the system if the rallying position is further away from the trajectory of the active flight plan than a distance threshold.

For example, the flight management system receiving by data link the trajectories of the other aircraft in proximity, through an ADS-B link or a TIS-B link for example, the directive can be rejected by the system if the aircraft and the target aircraft have no trajectory segment in common.

For example, the flight management system receiving by data link the trajectories of the other aircraft in proximity, through an ADS-B link or a TIS-B link for example, the directive can be rejected by the system if the rallying point does not belong to the trajectory of the active flight plan or does not belong to the trajectory of the target aircraft.

In an embodiment, the flight management system can send a message to the control center when the pilot of the aircraft does not confirm application thereof.

In a preferential embodiment, the flight management system can calculate the flight duration up to the rallying point making it possible to overfly the rallying point at a time corresponding substantially to the temporal separation value in respect of the target aircraft as given in the directive, assuming that the speed is constant up to the rallying point and equal to the forecast speed of the target aircraft at the rallying point.

In a preferential embodiment, the flight management system receiving by data link the forecast speeds of the other aircraft in proximity, if the flight duration up to the rallying point at the forecast speed of the target aircraft at the rallying point makes it possible, in a straight line, to pass beyond the rallying point, the flight management system can calculate a trajectory incorporating the directive. The trajectory can comprise a first change-of-heading point situated ahead of the aircraft on the trajectory of the active flight plan at a distance dependent on the diversion heading to be followed, this point making it possible to take the diversion heading given in the directive. The trajectory can comprise a CI leg starting from the first change-of-heading point and following the diversion heading. The trajectory can comprise a second change-of-heading point situated on the CI leg, this point making it possible to set a course heading towards the rallying point given in the directive. The trajectory can comprise a CF leg starting from the second change-of-heading point and following the heading towards the rallying point, so that the predicted time at the rallying point, assuming that the speed is constant up to the rallying point and equal to the forecast speed of the target aircraft at the rallying point, is substantially equal to the time corresponding to the temporal separation value in respect of the target aircraft as given in the directive. If the flight duration up to the rallying point at the forecast speed of the target aircraft at the rallying point does not make it possible, in a straight line, to pass beyond the rallying point, the flight management system can also calculate a trajectory incorporating the directive. The trajectory can comprise a DIRTO leg for directly attaining the rallying point, so that the predicted time at the rallying point, assuming that the speed is constant up to the rallying point and greater than the speed predicted for the target aircraft at the rallying point, is substantially equal to the time corresponding to the temporal separation value in respect of the target aircraft as given in the directive.

Advantageously, the flight management system can create a flight plan comprising, upstream of the rallying position, the legs created for attaining the rallying position, and downstream of the rallying position, the legs of the trajectory of the active flight plan which are downstream of the rallying point.

For example, the created flight plan can become the active flight plan on activation by the pilot, the trajectory incorporating the directive becoming the trajectory of the active flight plan, so as to allow the flight management system to execute the directive automatically.

For example, when the created flight plan becomes the active flight plan, its vertical profile can be calculated by the flight management system.

Advantageously, as long as the created flight plan has not become the active flight plan, the length of the CI leg can be updated as a function of the speed of the target aircraft, by modifying the second change-of-heading point and the CF leg.

Advantageously here again, as long as the target aircraft has not yet passed the rallying point, the time corresponding to the temporal separation value in respect of the target aircraft as given in the directive can be calculated periodically as a function of the speed of the target aircraft and a prediction of the time of passing the rallying point can be calculated periodically on the basis of the trajectory of the active flight plan incorporating the directive. Once the target aircraft has passed the rallying point, the time corresponding to the temporal separation value in respect of the target aircraft as given in the directive can be calculated on the basis of the time at which the target aircraft has actually passed the rallying point and a prediction of the time of passing the rallying point can be calculated periodically on the basis of the trajectory of the active flight plan incorporating the directive. As long as the second change-of-heading point has not yet been passed, if the predicted time of passing the rallying point does not make it possible to comply with the temporal separation given in the directive, then the second change-of-heading point can be recalculated so as to comply with the temporal separation. Once the second change-of-heading point has been passed, if the predicted time of passing the rallying point does not make it possible to comply with the temporal separation given in the directive, then the speed of the aircraft can be slaved to a speed making it possible to comply with the temporal separation.

The main advantages of embodiments of the invention are furthermore that it makes it possible to reupdate the instant or the position so as to set a course heading towards the rallying position as a function of the kinematics of the target airplane behind which it is necessary to align itself, doing so as long as the pilot has not yet confirmed the maneuver. Thus, it is perpetually the best maneuver to be flown which is proposed to the pilot. Once the pilot has confirmed the maneuver, embodiments of the invention further make it possible to reupdate the instant or the position so as to set a course heading towards the rallying position as a function of the kinematics of the target airplane behind which it is necessary to align itself, doing so as long as this instant or this spot have not been reached. Thus, it is always the best trajectory to be flown which is executed by the automatic pilot.

BRIEF DESCRIPTION OF THE DRAWINGS

Other characteristics and advantages of embodiments of the invention will become apparent with the aid of the description which follows in relation to appended drawings which represent.

DETAILED DESCRIPTION

Figure 1:
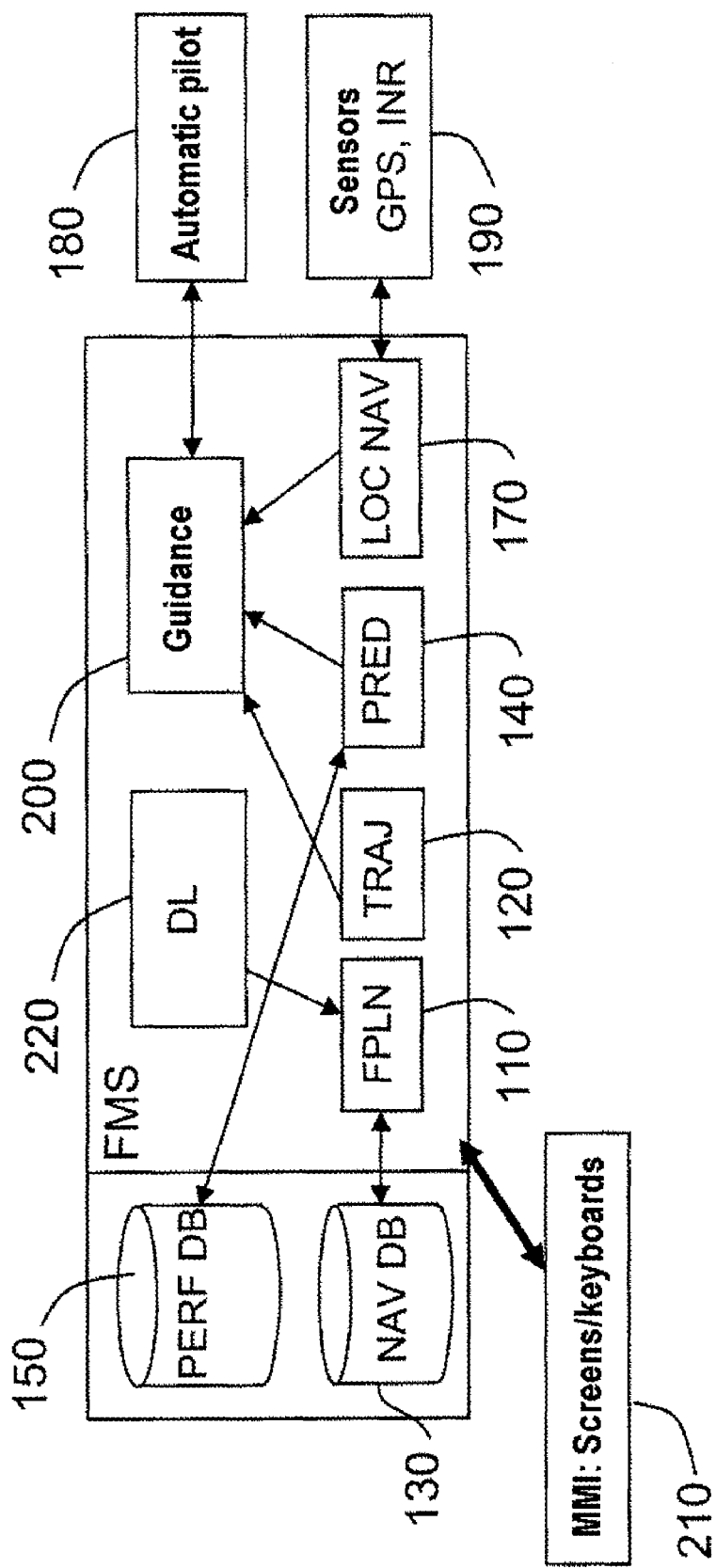
FIG. 1, through a chart, an illustration of an exemplary architecture of an FMS system making it possible to implement the invention.

FIG. 1 illustrates through a chart an exemplary architecture of an FMS making it possible to implement the invention. A guidance module 200 uses, as input, elements provided by a module 120 and by a module 140. A module 110 makes available the active flight plan. The module 120 provides elements of the reference trajectory arising from the active flight plan. The module 140 provides prediction elements constructed on the basis of the reference trajectory. For this purpose, the module 140 also uses a performance database 150, a navigation database 130 and the position and the airplane state vector originating from a location module 170. The location module 170 uses position sensors 190, such as a GPS beacon and/or an inertial platform for example. The FMS of the example of FIG. 1 also comprises a data link module 220.

Within the particular framework of an embodiment of the invention, the module 220 can make it possible notably to receive information about the surrounding traffic, this information arising either directly from the surrounding airplanes, or from the ground. For example, it may involve information about the surrounding traffic received by ADS-B or TIS-B link. A consolidated set of traffic data can also be used to reach a certain integrity level of the information. The module 220 also makes it possible to send and to receive digitized messages. Within the particular framework of the embodiment of the invention, it can for example make it possible to receive a message representing an HTMB directive. In addition to the identifier of the HTMB directive, an HTMB message received by the module 220 contains other parameters, such as a target airplane identifier, a diversion heading, a rallying position and a temporal separation value. The FMS of the example of FIG. 1 also comprises a display module 210. The module 210 conventionally makes it possible to display to the pilot the active flight plan and the predictions made on the basis of the active flight plan. But within the particular framework of the embodiments of the invention, the module 210 can also make it possible to display a dedicated page intended for introducing into the FMS the parameters of an HTMB directive received by radio, in the case where the ground control center is not equipped for emitting HTMB messages. In this case, the target airplane identifier, the diversion heading, the rallying position and the temporal separation value can be entered manually by the pilot. At this juncture, the module 110 optionally makes it possible to reject the directive. For example, the directive can be rejected if the target airplane identifier is unknown, that is to say if this identifier has not been received by ADS-B or TIS-B. The directive can also be rejected if the rallying position is manifestly unlikely in relation to the reference trajectory. It should be noted that, in an embodiment, a likelihood test based on a simple distance threshold can enable directives not to be rejected on the pretext that their rallying position is not situated very exactly on the reference trajectory. The module 110 can also verify that the two airplanes relevant to the maneuver have at least one trajectory segment in common. This can be verified through a likelihood test pertaining to the reference trajectory and to the intentions of the target airplane that are known by ADS-B or TIS-B. For example, the likelihood test can be to verify whether the rallying point belongs to the waypoints of the reference trajectory and to the waypoints deduced from the intentions of the target airplane. Whether or not the HTMB directive is rejected, the display module 210 allows the pilot to confirm or otherwise the application of the HTMB directive. For example, the pilot is informed of the rejection cases by way of the display module 210. The pilot can then accept the rejection, in which case a rejection message can be sent to the ground by way of the module 220 and the directive is not executed, or not accept the rejection, this amounting to confirming application of the HTMB directive. In the case where the message is rejected but where the pilot does not accept the rejection, this implies that the pilot deems the HTMB directive to be well founded despite the rejection by the FMS and that he wishes to execute it. For example, this can correspond to the case of a target airplane not having emitted its identifier in ADS-B or TIS-B but which is directly visible by the pilot.

In the case where application of the directive is confirmed by the pilot, whether the directive has been previously accepted or rejected by the system, the system automatically initializes a temporary flight plan. This temporary flight plan contains a pseudo-trajectory and waypoints which thereafter make it possible to create an "ASAS flight plan". This ASAS flight plan contains a trajectory usable by the FMS, this trajectory complying with the HTMB procedure up to the rallying point. Thus, once the ASAS flight plan has become the active flight plan, it becomes possible to execute the HTMB procedure with the automatic pilot.

The trajectory of the HTMB procedure is calculated as a chaining of two legs: a first leg corresponding to a heading directive, then a second leg corresponding to a directive to return towards a waypoint, namely the rallying point. For example, this can be the chaining of a CI leg ("Course to an Intercept") and of a CF leg ("Course to a Fix") forming what is referred to as a "dogleg" of CI-CF type ("Course to an Intercept, then Course to a Fix"). But embodiments of the invention are not limited to this CI-CF dogleg. Any other pair of legs which model the HTMB procedure when they are chained together can be used according to embodiments of the present invention.

Figure 2A:
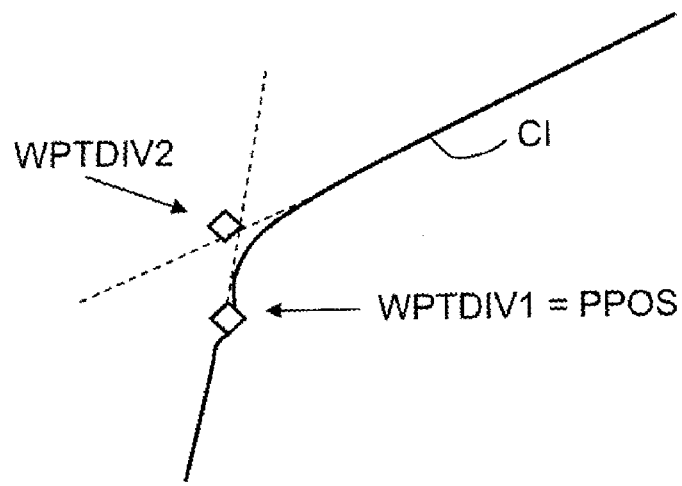
FIGS. 2a and 2b, through schematics, an illustration of a trajectory portion incorporating an HTMB directive.
Figure 2B:
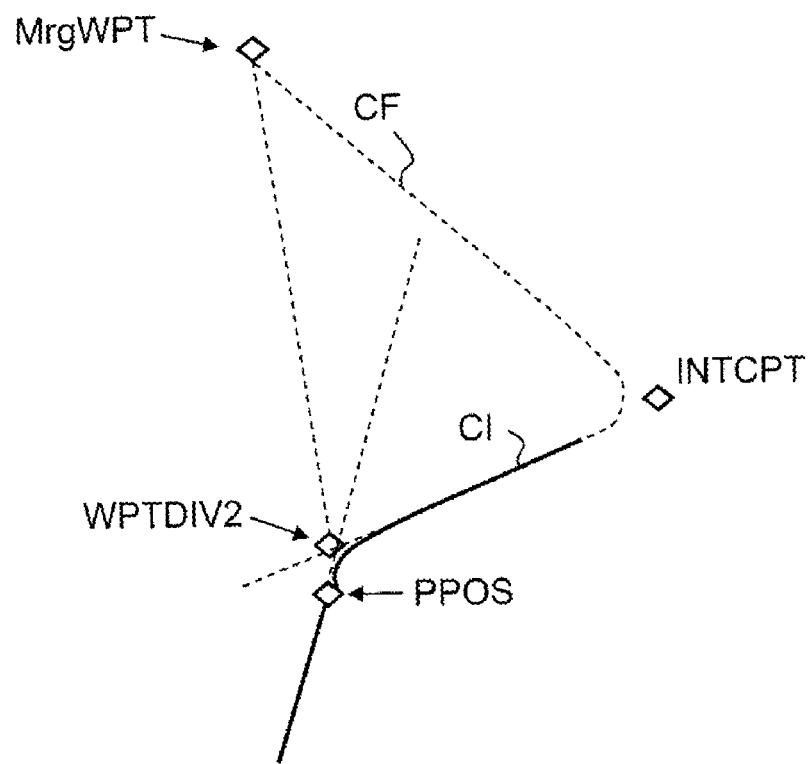

FIGS. 2a and 2b illustrate through schematics a trajectory portion incorporating an HTMB directive. The ultimate aim of the calculations is to find the trajectory of a CF leg which makes it possible to obtain a time prediction at a rallying point MgrWPT complying with the temporal separation value given in the HTMB directive. For this purpose, on departure from a diversion point WPTDIV1 belonging to the active trajectory, numerous assumptions are made. In the present example, WPTDIV1 can be the current position PPOS of the airplane. But a point of the trajectory situated immediately ahead of the airplane at a parametrizable distance can be used.

Assumptions are first of all made relating to the speed on the CI-CF dogleg. A first assumption can be made relating to the speed at the rallying point MrgWPT, namely that the speed at the rallying point is the same as the speed V_MrgWPT predicted for the target airplane at the rallying point. The speed on departure from the CI-CF dogleg being the current speed V_PPOS slaved by the FMS, an assumption is made relating to the point at which the speed is changed from V_PPOS to V_MrgWPT. For example, it can be assumed that, as soon as the ASAS procedure is inserted into the flight plan, a change of speed is performed with the speed V_MrgWPT as new directive. This is why the CI leg can be calculated with an assumption of constant speed at V_MrgWPT, likewise for the CF leg. This will be explained hereinafter. At the waypoints which follow the rallying point MrgWPT, these points being common to the reference trajectory and to the trajectory of the target airplane, the speed constraints of the flight plan of the target airplane can be applied. Any "former" speed constraints, given by the reference trajectory, at the waypoints which follow the rallying point are no longer used. They are however preserved for the case of cancellation of the ASAS procedure.

Then, assumptions are also made relating to the altitude on the CI-CF dogleg. The altitude constraints given by the reference trajectory between the current position PPOS and the rallying point MrgWPT are no longer given consideration. They are however preserved. The altitude constraints given by the reference trajectory beyond the rallying point MrgWPT continue to be given consideration.

Then, assumptions are also made relating to the arrival time. Thus, if an RTA ("Requested Time of Arrival") arrival time was requested in the reference trajectory, the latter is no longer given consideration, the separation constraint taking priority in an ASAS flight plan over the requested arrival time.

Then, assumptions are also made relating to the duration required to fly the whole of the CI-CF dogleg. Thus, the assumption is made that the rallying point MrgWPT will be overflown at a time making it possible to comply substantially with the temporal separation value in respect of the target airplane given in the HTMB directive, this time being called the RTS hereinafter ("Requested time of Separation"). Thus, the duration to fly the CI-CF dogleg is equal to the lag between the current time and the RTS time. Hereinafter, this duration will be called T_Dogleg.

Then, as illustrated by FIG. 2a, assumptions are also made relating to the first change-of-heading point for taking the diversion heading given by the HTMB directive. Thus, a virtual diversion point WPTDIV2 is firstly created ahead of the airplane at a distance dependent on the diversion heading to be followed. A turn is thereafter calculated with a speed assumption V_DivWPT from the effective diversion point, namely PPOS in the present example.

Then, as illustrated by FIG. 2b, assumptions are also made relating to the second change-of-heading point for setting a course heading towards the rallying point MrgWPT. Thus, a point INTCPT is created on a CI leg starting from WPTDIV2 and following the diversion heading. At this juncture and on the basis of the previous assumptions, two cases are possible.

In a first case, flying for the duration T_Dogleg at the speed V_MrgWPT in a straight line makes it possible to pass beyond the rallying point MrgWPT. A CI-CF dogleg comprising a CI leg of nonzero length can therefore be created, so as to delay overflight of the rallying point MrgWPT and to overfly it substantially at the RTS time. It suffices to firstly calculate the flight times of each of the two segments making it possible to overfly the rallying point MrgWPT at the RTS time, these times being unique. Then, a series of legs can be created including for example the CI and CF legs as explained previously. Thereafter, the trajectory including the series of legs can be calculated, as well as the predictions at the rallying position MrgWPT. Notably, the estimated time at which the rallying point MrgWPT is passed preferably is close to RTS.

In a second case, flying for the duration T_Dogleg at the speed V_MrgWPT may not make it possible to attain the rallying point MrgWPT, even in a straight line. It is therefore not possible to create a CI-CF dogleg comprising a CI leg of nonzero length making it possible to overfly the rallying point substantially at the RTS time, since even a CI-CF dogleg comprising a CI leg of zero length would not make it possible to overfly the rallying point at the RTS time. In this case, it is not even necessary to create a CI-CF dogleg comprising a CI leg of nonzero length, since it is not in fact even necessary to delay the airplane, the latter complying right now with the temporal separation value at the rallying point. In this case, a CI-CF dogleg with a CI leg of zero length can be created, this amounting to a DIRTO ("Direct To") leg. It suffices for example to create a series of legs including a "Direct To" leg and to assume that the speed is greater than V_MrgWPT, so as to overfly the rallying point MrgWPT at the RTS time. Thereafter, the trajectory including the series of legs can be calculated, as well as the predictions at the rallying position MrgWPT. Notably, the estimated time of passing the rallying point preferably is close to RTS.

It remains to create the actual ASAS flight plan. For this purpose, the series of legs previously created can be concatenated with the legs of the active flight plan which are downstream of the rallying point MrgWPT. Then, a flight plan can be created, either in a secondary flight plan, or in a temporary flight plan, or in a flight plan of the "Option Route" type. Finally, this flight plan can become the active flight plan on manual activation by the pilot. Thus, the automatic pilot can execute the HTMB maneuver.

It should be noted that as long as the newly created ASAS flight plan has not become the active flight plan, the trajectory that it contains can be refreshed regularly as a function of the kinematics of the target airplane, for example every 3 seconds. Notably, the length of the CI leg and the CF leg which follows it can be updated, by modifying the second change-of-heading point INTCPT making it possible to set a course heading towards the rallying point MrgWPT. It should be noted that in no case may the diversion heading be modified, since this is a directive of the ground controller and not the result of a calculation. The vertical profile of the ASAS flight plan can for example be calculated by the FMS as soon as the ASAS flight plan becomes the active flight plan. In most cases, the lateral profile of the ASAS flight plan is longer than the lateral profile on which the airplane lay before execution of the HTMB directive. Consequently, the airplane descended more quickly before the execution of the HTMB directive than it should during execution of the HTMB directive. This is why, once the ASAS flight plan has been activated, the airplane is often situated too low with respect to its new vertical profile.

As long as the target airplane has not yet passed the rallying point MrgWPT, the predictions can be recalculated cyclically, notably the time of passing the rallying point, on the basis of the target airplane's intentions known by ADS-B or TIS-B. As long as the second change-of-heading point INTCPT making it possible to set a course heading towards the rallying point has not yet been passed, if the predicted time of passing the rallying point MrgWPT does not make it possible to comply with the temporal separation given in the HTMB directive, then the second change-of-heading point INTCPT can be recalculated so as to comply with this temporal separation. The CF leg making it possible to attain the rallying point can therefore also be recalculated. But the vertical profile is frozen, it is not reupdated. Once the second change-of-heading point INTCPT making it possible to set a course heading towards the rallying point has been passed, if the predicted time of passing the rallying point does not make it possible to comply with the temporal separation given in the HTMB directive, then the speed of the airplane can be slaved to a speed making it substantially possible to comply with the temporal separation given in the HTMB directive.

Once the target airplane has passed the rallying point Mrg-WPT, the same updates can be made, but taking the time at which the target airplane has actually passed the rallying point, and no longer on the basis of intentions known by ADS-B or TIS-B.

The ground controller can cancel the HTMB directive, by radio or by data link. Cancellation by radio is given consideration manually by the pilot. Cancellation by data link can be given consideration automatically by the FMS. If the ASAS flight plan has not yet been activated by the pilot, then it can simply be erased. If the ASAS flight plan has already been activated by the pilot, then its lateral profile can be frozen and it is no longer updated as a function of the kinematics of the target airplane. The separation holding mechanisms described above can be stopped and the speed can be maintained at the current value. The former constraints on speed and arrival time, which had been preserved, can be restored and given consideration by the FMS to calculate a new flight plan, which will necessarily have an impact on the vertical profile.

Embodiments of the invention have furthermore the main advantages that it is independent of the vertical profile since it modifies only the speed profile. Thus, embodiments of the invention do not find its sole application in an approach zone or in a terminal zone, the en-route controllers being able optionally to pass HTMB directives. Additionally, it is equally compatible with conventional descent approach profiles and with profiles of the "Continuous Descent Approach" (CDA) type or flat profiles, or ones with stepped altitudes in a cruising phase. Finally, apart from the need to be certified, the above-described embodiments of the invention do not pose any particular problem of integration into current FMSs.

The invention claimed is:

1. A method of applying a guidance directive sent by an air traffic control center to an aircraft that includes a flight management system, the flight management system enabling automatic following of a trajectory of an active flight plan, the directive including a target aircraft identifier, a diversion heading, a rallying position (MrgWPT) and a temporal separation value,
the aircraft directed to take the diversion heading and attain the rallying position behind a target aircraft while complying with the temporal separation value in respect of the target aircraft, the method comprising the steps of:
validating a received directive by the flight management system, to determine whether the directive is to be accepted or rejected by the flight management system;
confirming application of the directive, to indicate whether the directive has been accepted or rejected by the flight management system;
creating a flight plan to incorporate the directive, by the flight management system; and
activating the flight plan to incorporate the directive, so that the directive is executed automatically by the flight management system while the trajectory of the flight plan that incorporates the directive is followed.

2. The method as claimed in claim 1, further comprising the step of:
introducing the directive manually into the flight management system, by a pilot,
wherein the directive is sent by the air traffic control center to the aircraft by radio.

3. The method as claimed in claim 1, wherein the air traffic control center sends the directive to the aircraft by a data link, the directive being in the form of a digitized message received by the flight management system.

4. The method as claimed in claim 1, further comprising the step of:
rejecting the directive, by the flight management system, if the identifier of the target aircraft has not been received by the flight management system, wherein the flight management system is configured to receive identifiers of other aircraft in proximity by way of a data link.

5. The method as claimed in claim 4, wherein the flight management system receives identifiers of other aircraft in proximity through an ADS-B link or a TIS-B link.

6. The method as claimed in claim 1, wherein the directive is rejected by the flight management system if the rallying position (MrgWPT) is further away from the trajectory of the active flight plan than a distance threshold.

7. The method as claimed in claim 1, further comprising the step of:
rejecting the directive, by the flight management system, if the aircraft and the target aircraft have no trajectory segment in common, wherein the flight management system is configured to receive trajectories of other aircraft in proximity by way of a data link.

8. The method as claimed in claim 7, wherein the flight management system receives trajectories of other aircraft in proximity through an ADS-B link or a TIS-B link.

9. The method as claimed in claim 1, further comprising the step of:
rejecting the directive, by the flight management system, if the rallying position (MrgWPT) does not belong to the trajectory of the active flight plan or does not belong to the trajectory of the target aircraft, wherein the flight management system is configured to receive trajectories of other aircraft in proximity by way of a data link.

10. The method as claimed in claim 1, further comprising the step of:
sending a message to the air traffic control center, by the flight management system, when a pilot of the aircraft does not confirm application of the directive.

11. The method as claimed in claim 1, further comprising the step of:
calculating a flight duration up to the rallying position, by the flight management system, to allow overflight of the rallying position at a time that corresponds substantially to the temporal separation value in respect of the target aircraft,
wherein a speed of the aircraft is substantially constant up to the rallying position and substantially equal to a forecasted speed of the target aircraft at the rallying position.

12. The method as claimed in claim 11 wherein, if the flight duration up to the rallying position (MrgWPT) at the forecasted speed of the target aircraft at the rallying position makes it possible, in a straight line, to pass beyond the rallying position, the method further comprises the step of:
calculating a trajectory to incorporate the directive, by the flight management system, said trajectory including:
a first change-of-heading point (WPTDIV2) situated ahead of the aircraft on the trajectory of the active flight plan at a distance dependent on the diversion heading to be followed, the first change-of-heading point making it possible to take the diversion heading given in the directive;

a CI leg starting from the first change-of-heading point (WPTDIV2) and following the diversion heading;

a second change-of-heading point (INTCPT) situated on the CI leg, the second change-of-heading point making it possible to set a course heading towards the rallying position (MrgWPT) given in the directive; and a CF leg starting from the second change-of-heading point (INTCPT) and following the heading towards the rallying position (MrgWPT), so that a predicted time at the rallying position, for a speed of the aircraft that is substantially constant up to the rallying position and substantially equal to the forecast speed of the target aircraft at the rallying position, is substantially equal to the time corresponding to the temporal separation value in respect of the target aircraft as given in the directive.

13. The method as claimed in claim 12, wherein the flight management system creates a flight plan comprising:

upstream legs created for attainment of the rallying position;

downstream legs of the trajectory of the active flight plan which are downstream of the rallying position.

14. The method as claimed in claim 13, wherein the created flight plan becomes the active flight plan on activation by a pilot, the trajectory that incorporates the directive becomes the trajectory of the active flight plan, so as to allow the flight management system to execute the directive automatically.

15. The method as claimed in claim 14, wherein when the created flight plan becomes the active flight plan, a vertical profile of the created flight plan is calculated by the flight management system.

16. The method as claimed in claim 14, wherein, as long as the target aircraft has not yet passed the rallying position (MrgWPT), the method further comprises the steps of:

calculating periodically a time that corresponds to the temporal separation value in respect of the target aircraft as given in the directive, as a function of the speed of the target aircraft;

calculating periodically a prediction of a time to pass the rallying position, on the basis of the trajectory of the active flight plan that incorporates the directive.

17. The method as claimed in claim 16, wherein, if the second change-of-heading point (INTCPT) has not yet been passed, and if the predicted time to pass the rallying position (MrgWPT) does not make it possible to comply with the temporal separation value given in the directive, then the method further comprises the step of:

recalculating the second change-of-heading point so as to comply with the temporal separation value.

18. The method as claimed in claim 16, wherein, once the second change-of-heading point (INTCPT) has been passed, if the predicted time to pass the rallying position (MrgWPT) does not make it possible to comply with the temporal separation value given in the directive, then the method further comprises the step of:

slaving the speed of the aircraft to a speed that makes it possible to comply with the temporal separation value.

19. The method as claimed in claim 14, wherein, once the target aircraft has passed the rallying position (MrgWPT), the method further comprises the steps of:

calculating a time that corresponds to the temporal separation value in respect of the target aircraft as given in the directive, on the basis of the time at which the target aircraft has actually passed the rallying position;

calculating periodically a prediction of the time to pass the rallying position, on the basis of the trajectory of the active flight plan that incorporates the directive.

20. The method as claimed in claim 12, wherein, as long as the created flight plan has not become the active flight plan, the method further comprises the steps of:

modifying the second change-of-heading point (INTCPT); and modifying the CF leg.

21. The method as claimed in claim 11 wherein, if the flight duration up to the rallying position (MrgWPT) at the forecast speed of the target aircraft at the rallying position does not make it possible, in a straight line, to pass beyond the rallying position, the method further comprises the step of:

calculating a trajectory that incorporates the directive, by the flight management system, wherein said trajectory includes a DIRTO leg for direct attainment of the rallying position, so that the predicted time at the rallying position, for a speed that is substantially constant up to the rallying position and greater than the speed predicted for the target aircraft at the rallying position, is substantially equal to the time that corresponds to the temporal separation value in respect of the target aircraft as given in the directive.

22. The method as claimed in claim 1, wherein the step of confirming application of the directive is performed by a pilot of the aircraft.

23. The method as claimed in claim 1, wherein the step of activating the flight plane is performed by a pilot of the aircraft.

* * * * *